United States Patent [19]
Burke

[11] 3,982,031
[45] Sept. 21, 1976

[54] ALUM TANNING PROCESS FOR EDIBLE COLLAGEN CASING

[75] Inventor: Noel Ian Burke, Danville, Ill.

[73] Assignee: Tee-Pak, Inc., Chicago, Ill.

[22] Filed: Nov. 3, 1975

[21] Appl. No.: 628,260

[52] U.S. Cl. .............................. 426/273; 426/140; 426/277; 426/278; 264/202
[51] Int. Cl.² ........................................ A22C 13/00
[58] Field of Search ........... 426/140, 273, 277, 278, 426/576, 657, 276; 264/202, 209

[56] References Cited
UNITED STATES PATENTS

| | | | |
|---|---|---|---|
| 3,123,480 | 3/1964 | Lieberman | 426/140 X |
| 3,151,990 | 10/1964 | McKnight | 426/140 X |
| 3,512,997 | 5/1970 | Cohly et al. | 426/140 X |

Primary Examiner—A. Louis Monacell
Assistant Examiner—Esther L. Massung
Attorney, Agent, or Firm—Paul Shapiro; Joseph E. Kerwin; William A. Dittmann

[57] ABSTRACT

An improved process for tanning edible collagen food casings wherein the coagulated and washed collagen casing is exposed to a tanning bath which is free of aluminum chelating reagents and contains a mixture of aluminum ammonium sulfate, as $AlNH_4(SO_4)_2 \cdot 12H_2O$ and monobasic aluminum sulfate ($AlOHSO_4$), the concentration of the aluminum ammonium sulfate in the bath being less than 3% by weight and the molar ratio of aluminum ammonium sulfate to monobasic aluminum sulfate being in the range of 1:2 to 2:1.

7 Claims, No Drawings

ALUM TANNING PROCESS FOR EDIBLE COLLAGEN CASING

BACKGROUND OF THE INVENTION

1. Field of the Invention

This invention relates to the manufacture of edible food casings derived from animal hide collagen and more particularly to an improved method of tanning the casings in a bath containing a mixture of aluminum ammonium sulfate and monobasic aluminum sulfate.

2. The Prior Art

Collagen casings have been widely accepted as edible food casings for pork sausages.

In the preparation of edible collagen casings, hide collagen derived from animal hides is converted into a finely divided fibrillar form and extruded in the form of a dilute collagen slurry. Usually, the extruded collagen is passed into a sodium sulfate or ammonium sulfate coagulating bath which dehydrates the collagen slurry and forms a coherent collagen film. At this stage in the processing, the salt coagulated collagen film can be handled. However, removal of the ammonium sulfate or other coagulating salt from the film by washing with subsequent wash waters will cause the collagen film to revert to a paste or slurry.

It is therefore necessary to harden or tan the extruded collagen film to permit further processing of the film through the steps of washing, drying, shirring and stuffing.

One of the most widely used methods of tanning collagen casings is described in U.S. Pat. No. 3,123,481 which utilizes a tanning bath containing 3 to 18% by weight of a citrato complex of aluminum ammonium sulfate (alum). One drawback to this process is that alum tanned casings are somewhat stiff and difficult to link after stuffing and have a tendency to split during stuffing. The citric acid chelating or complexing agent present in the bath eventually finds its way into the process effluent and must be removed therefrom as its presence evokes a pollution problem, citric acid being one of the major sources of carbon for bacterial growth in process tanks.

SUMMARY OF THE INVENTION

In accordance with the present invention, coagulated collagen casings are tanned in a tanning bath which is free of aluminum chelating or complexing agents and contains a mixture of aluminum ammonium sulfate and monobasic aluminum sulfate at a molar ratio of 1:2 to 2:1 and less than 3% by weight of the aluminum ammonium sulfate is present in the bath. The resultant edible collagen casing which has been tanned in accordance with the present invention exhibits improved tear characteristics and substantially less splitting of the casing is experienced during stuffing. The method of the present invention also has the additional advantage of simplifying the preparation of the casing and avoiding problems with respect to process plant effluent containing the citric acid used to prepare the citrato alum complex.

PREFERRED EMBODIMENTS

Collagen which is suitable for the preparation of edible casings is usually obtained from bovine hides. Collagen is formed of a large number of fibers which in turn consist of a much greater number of fibrils of sub-microscopic size. Collagen fibrils have a diameter of the order of 10–50 angstroms and lengths ranging from several thousand up to several million angstroms. Recent patents describing the production of edible collagen casings have emphasized the necessity of using collagen source materials which have not been subjectd to a liming treatment for the reason that the liming treatment allegedly prevents the bursting of the collagen fibers to release the fibrils which is necessary for the formation of fibrillar films. However, it has also been found that edible casings can be made from collagen sources which have been subjected to liming. A complete description of one such process is disclosed in my pending application U.S. Ser. No. 561,117 filed Mar. 24, 1975.

In practicing the process of the present invention, edible collagen casings can be prepared from collagen derived from unlimed or limed hides. In preparing the edible collagen casings from unlimed hides, hide splits are cut into small pieces and passed through a meat grinder until reduced to a very small size. The ground collagen then is swollen in a dilute solution of an organic acid such as lactic acid or citric acid to produce a slurry having a collagen content in the range from about 2 – 6% by weight.

If the hide splits are derived from limed hides, the hide splits prior to being ground and swollen are washed to remove the lime in the hides or the split is neutralized by treatment with a non-toxic acid such as lactic acid to form water-soluble calcium salts. The neutralized hide then is washed with water to remove most of the by-product salts. Slurries of the washed hides are then prepared following the same procedure as used for unlimed hides.

In preparation of tubular casings, the swollen collagen surry obtained as described above from unlimed collagen or limed collagen is extruded through an annular die. Preferably, the collagen slurry is extruded through a die having counter-rotating inner or outer parts or both which is well known in the prior art in the preparation of collagen casings, as shown in Becker in U.S. Pat. No. 2,046,541.

The casing is extruded into a coagulating bath such as those consisting of a concentrated, preferably saturated solution of sodium sulfate or ammonium sulfate adjusted to a pH of between 7 to 9 with an alkaline agent such as NaOH or NH$_4$OH for neutralization of acid. Any bath capable of coagulating the extruded collagen slurry to form a coherent film which is non-toxic can be used for practicing the invention. However, ammonium or sodium sulfate coagulating baths are most comman and are preferred.

After coagulation, the gel collagen casing is passed into a tanning bath containing a mixture of aluminum ammonium sulfate and monobasic aluminum sulfate at a molar ratio ranging from 1:2 to 2:1. Desirably, the molar ratio of aluminum sulfate to monobasic aluminum sulfate is in the range of 1.0:0.9 to 0.9:1.0 and preferably the salts are present in the bath at about equal molar ratios. It is also critical to the practice of the present invention that the concentration of aluminum ammonium sulfate in the bath be less than 3% and generally about 1.0 to 2.50 percent by weight and preferably about 1.25 to 2.25 percent by weight of the aluminum ammonium sulfate is used. As will hereinafter be illustrated, if the bath contains 3 percent by weight aluminum ammonium sulfate a significant diminution in the physical properties of the collagen casing occurs. It is critical to the process of the present invention that no chelating or complexing agent be incorporated in the tanning bath. As will hereinafter be illustrated, if following the practice of the prior art, a chelating agent is incorporated in the tanning bath, there will also result a significant diminution in collagen casing physical properties.

The monobasic aluminum sulfate is generally present in the tanning bath at a concentration of 0.25 to 0.85 percent by weight and preferably at a concentration of about 0.35 to 0.70 percent by weight.

The amount of time that the casing is immersed in the tanning bath of the present invention will generally range from 2 to 15 minutes and preferably from 2 to 8 minutes.

The solution of the aluminum ammonium sulfate-monobasic aluminum sulfate mixtures may be prepared by the separate dissolution of the individual salts in water at the concentrations required in the practice of the present invention. A more convenient and therefore more desirable procedure for preparing the tanning solutions used in the practice of the present invention is to prepare a concentrated solution, e.g., 8–10% by weight, of aluminum sulfate in water. Ammonia ($NH_3$) is added to the bath in stoichiometric amounts based on the aluminum sulfate in the solution to prepare a solution containing equal molar amounts of $AlNH_4(SO_4)_2 \cdot 12H_2O$ and monobasic aluminum sulfate. The pH of the solution after the ammonia addition is in the range of 3.8–4.0. The concentrated solution of the aluminum ammonium sulfate-monobasic aluminum sulfate is then added to the tanning bath at such a rate as to dilute the mixed salt solution to provide the bath with an aluminum ammonium sulfate concentration of less than 3% by weight.

The casing after removal from the tanning bath is subsequently washed and plasticized in a bath containing both a plasticizer such as glycerine and a softening agent such as an acetylated monoglyceride following conventional practice e.g., as described in U.S. Pat. No. 3,620,775. The casing which is prepared in this manner is then inflated with air or other gas and passed through a dryer and dried. The dried casing is then shirred and packaged for shipment to the meat packer.

The following Example is provided to illustrate the invention and is not intended to restrict the scope thereof. All percentages in the Example are expressed as weight percentages unless otherwise specified.

EXAMPLE

In a series of runs, an aqueous slurry containing 2.4% lactic acid and 5.1% collagen derived from limed hide splits was pumped under pressure through an extrusion die into an aqueous coagulation bath containing sufficient $(NH_4)_2 SO_4$ to saturate the bath. The pH of the bath was $8.2 \pm 0.3$. After the casings were coagulated, the coagulated casings were removed from the ammonium sulfate coagulation bath and hardened by passing the casings into a tanning bath containing 1.32 to 1.75% $Al(NH_4)_2 SO_4 \cdot 12 H_2O$ (alum) and 0.41 to 0.54% $AlOHSO_4$. After about 6 minutes of contact with the tanning bath, the hardened casings were removed and plasticized by passing them through an aqueous solution of 3% glycerine for about 3 minutes. Thereafter, the plasticized casing was inflated and dried. The dried casings were shirred and shipped to a meat packer for stuffing.

To determine the tear resistance of the casings, the dried casings were soaked in water and the Elmendorf tear of the wet casings was measured both in the longitudinal (long.) and transverse (trans.) direction.

In measuring Elmendorf tear, the higher the tear value the greater resistance of the casing to tear. A Elmendorf value of 25 in the longitudinal direction and value of 18 in the transverse direction is acceptable for commercial sausage stuffing.

The stuffing of the casings was observed at the meat packer and the percent of links in a 40-foot strand of casing which encountered linker breakage during stuffing (i.e., the percent of casings which split at the shoulder portion of the meat filled casing during twisting to prepare sausage links) was observed and recorded. The results of the Elmendorf tear tests and the % linker breakage of stuffed and linked collagen casings made in accordance with the procedure of the Example are recorded in the Table below.

For purposes of comparison, the runs of the Example were repeated with the exception that the tanning baths either included a citric acid chelating agent and/or an amount of alum in excess of 3% as well as a bath having an alum concentration of 3% in which citric acid was excluded. The results of these comparative runs are also recorded in the Table and are designated by the symbol "C".

TABLE

| Run No. | Alum In Tanning Bath (%) | Moles | AlOHSO$_4$ In Tanning Bath (%) | Moles | % Citric Acid In Tanning Bath | Elmendorf Long. | Tear Test Trans. | % Linker Breakage |
|---|---|---|---|---|---|---|---|---|
| 1. | 2.17 | 0.048 | 0.67 | 0.048 | 0 | 65.0 | 35.0 | 1.8 |
| 2. | 1.75 | 0.039 | 0.54 | 0.039 | 0 | 37.0 | 19.0 | 2.0 |
| 3. | 1.75 | 0.39 | 0.54 | 0.039 | 0 | 47.0 | 25.0 | 3.0 |
| 4. | 1.75 | 0.039 | 0.54 | 0.039 | 0 | 26.5 | 19.0 | 3.6 |
| 5. | 1.50 | 0.033 | 0.46 | 0.033 | 0 | 32.0 | 26.0 | 3.0 |
| 6. | 1.42 | 0.031 | 0.44 | 0.031 | 0 | 21.0 | 16.0 | 3.6 |
| 7. | 1.34 | 0.030 | 0.41 | 0.029 | 0 | 40.0 | 20.0 | 2.7 |
| C$_1$ | 2.35 | 0.052 | 0.73 | 0.052 | 0.82 | 12.0 | 10.0 | 12.0 |
| C$_2$ | 1.75 | 0.039 | 0.54 | 0.039 | 0.70 | Not Strong Enough to Produce Casing | | |
| C$_3$ | 1.42 | 0.031 | 0.44 | 0.031 | 0.45 | Not Strong Enough to Produce Casing | | |
| C$_4$ | 3.0 | 0.066 | 0.93 | 0.066 | 0 | 39.0 | 20.0 | 6.0 |
| C$_5$ | 3.2 | 0.070 | 0.99 | 0.071 | 1.00 | 10.0 | 15.5 | 12.0 |

By referring to the Table, it is immediately apparent that collagen casings processed through tanning baths free of a citric acid complexing agent and containing less than 3% alum and an equal molar concentration of AlOHSO$_4$ have substantially improved physical properties when compared to collagen casings processed through tanning baths containing citric acid or alum concentrations in admixture with AlOHSO$_4$ outside the scope of the present invention.

What is claimed is:

1. In a process for producing an edible collagen casing which comprises extruding an aqueous collagen slurry through a die into an aqueous coagulating medium to form a collagen casing, tanning the coagulated casing in a tanning bath containing aluminum salts and drying to produce an edible casing product, the improvement for tanning the collagen casing which comprises immersing the coagulated casing in a tanning bath which is free of any aluminum chelating agents and contains an admixture of aluminum ammonium sulfate and monobasic aluminum sulfate at a molar ratio in the range of 1:2 to 2:1, the aluminum ammonium sulfate being present in the bath in an effective amount at a concentration of less than 3% by weight.

2. The process of claim 1 wherein the molar ratio of aluminum ammonium sulfate to monobasic aluminum sulfate is about 1:1.

3. The process of claim 1 wherein the aluminum ammonium sulfate is present in the tanning bath at a concentration of about 1.0 to about 2.5% by weight.

4. The process of claim 1 wherein the aluminum ammonium sulfate is present in the tanning bath at a concentration of about 1.25 to 2.25% by weight.

5. The process of claim 1 wherein the monobasic aluminum sulfate is present in the tanning bath at a concentration of about 0.25 to about 0.85% by weight.

6. The process of claim 1 wherein the monobasic aluminum sulfate is present in the tanning bath at a concentration of about 0.35 to 0.70% by weight.

7. The process of claim 1 wherein the tanning bath is prepared by dissolving aluminum sulfate in water, reacting the aluminum sulfate with a stoichiometric amount of ammonia to form a mixture of AlNH$_4$(SO$_4$)$_2$ . 12H$_2$O and AlOHSO$_4$ and then adjusting the salt concentration in the bath so that the concentration of AlNH$_4$(SO$_4$)$_2$ . 12H$_2$O in the bath is less than 3% by weight and the molar ratio of AlNH$_4$(SO$_4$)$_2$ . 12H$_2$O to AlOHSO$_4$ is in the range of 1:2 to 2:1.

* * * * *